Nov. 24, 1959

C. B. DALE 2,914,620

SOUND RECORDING APPARATUS

Filed Jan. 18, 1956

3 Sheets-Sheet 1

INVENTOR:
COLIN B. DALE
BY [signature]
ATT'Y

Nov. 24, 1959 C. B. DALE 2,914,620

SOUND RECORDING APPARATUS

Filed Jan. 18, 1956

3 Sheets-Sheet 2

INVENTOR:
COLIN B. DALE
BY
Watson D. Harbaugh
ATT'Y

FIG. 6
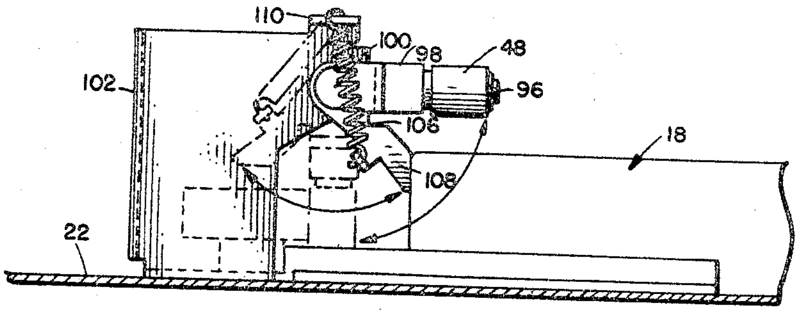
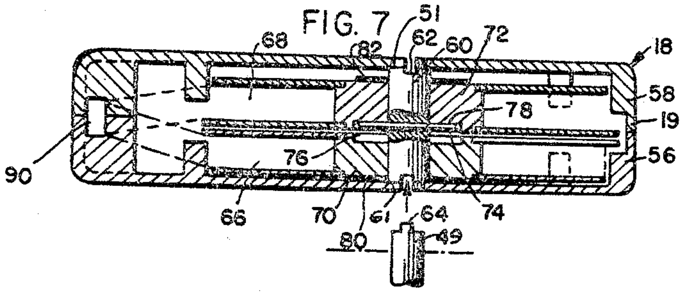
FIG. 7
FIG. 8
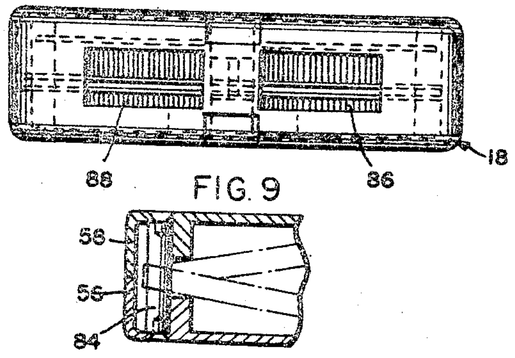
FIG. 9
FIG. 10
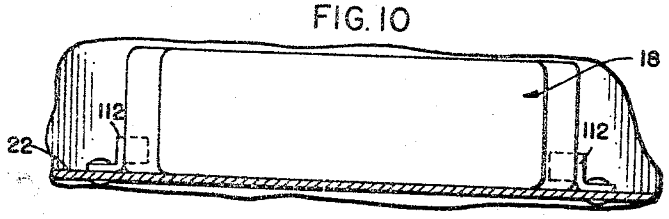
INVENTOR:
COLIN B. DALE
BY [signature]
ATT'Y

United States Patent Office 2,914,620

Patented Nov. 24, 1959

2,914,620

SOUND RECORDING APPARATUS

Colin B. Dale, Oak Park, Ill., assignor to Webcor, Inc., a corporation of Illinois Application January 18, 1956, Serial No. 559,820

16 Claims. (Cl. 179—100.2)

This invention relates to sound recording apparatus and more particularly to a tape recorder having a unitary cartridge by means of which recording tape may be unwound from one spool, fed into engagement with a recording or reproducing head, rewound on another spool and these steps reversed without the need for handling either the tape or the spools.

Prior to the present invention, recording tape was customarily unwound from one spool, urged into engagement with a recording head, and wound on another spool which was spaced some distance from the first spool. After sound was recorded on one half of the tape, both of the spools had to be transposed in order to record sound on the other half of the tape. This same procedure had to be carried out when the sound was reproduced. As a result of this excessive handling of the tape, the tape often became tangled, twisted, and broken and delays and personal irritations are incurred in correcting the trouble and repairing the fracture. In addition, the tape in prior art devices was exposed to the atmosphere during shipping and handling and the tape became contaminated with dust and condensation.

With the foregoing in mind, a primary object of the invention is to provide an apparatus in which the necessity for handling recording tape and separate reels by hand is obviated, and in which the tape is protected during shipping and handling against contamination by foreign materials and condensation.

A further object of the invention is to provide an improved apparatus in which recording tape may be impressed with sound over one-half of its width, and then may be impressed with sound over the other half of its width with a single recording head by a simple movement of a single tape and spool cartridge.

Another object of the invention is to provide a unitary invertible cartridge in which the tape is not touched by hand and the tape can be traversed at a constant speed with the varying speed differential between spools accommodated in the cartridge itself.

A further object of the invention is to provide a tape recorder for utilizing a unitary cartridge of the type described and for selectively driving one of the spools.

A further object of the invention is to provide a device of the character described which is characterized by convenience in form for handling and improved functional characteristics.

Other and further objects, advantages and features of the present invention will be apparent to those skilled in the art from the following description, taken in conjunction with the accompanying drawings in which similar reference characters relate to similar parts and in which:

Fig. 6 is a fragmentary elevational view showing the pivotally mounted idler roller in inoperative position and illustrating in dot-and-dash lines the position it assumes when the cartridge is in operative position;

Fig. 7 is a vertical elevational view taken substantially on line 7—7 of Fig. 3;

Fig. 8 is an elevational view taken substantially on line 8—8 of Fig. 3;

Fig. 9 is a vertical sectional view taken substantially on line 9—9 of Fig. 3; and Fig. 10 is an elevational view taken substantially on line 10—10 of Fig. 2.

Figures 1, 2, 3:
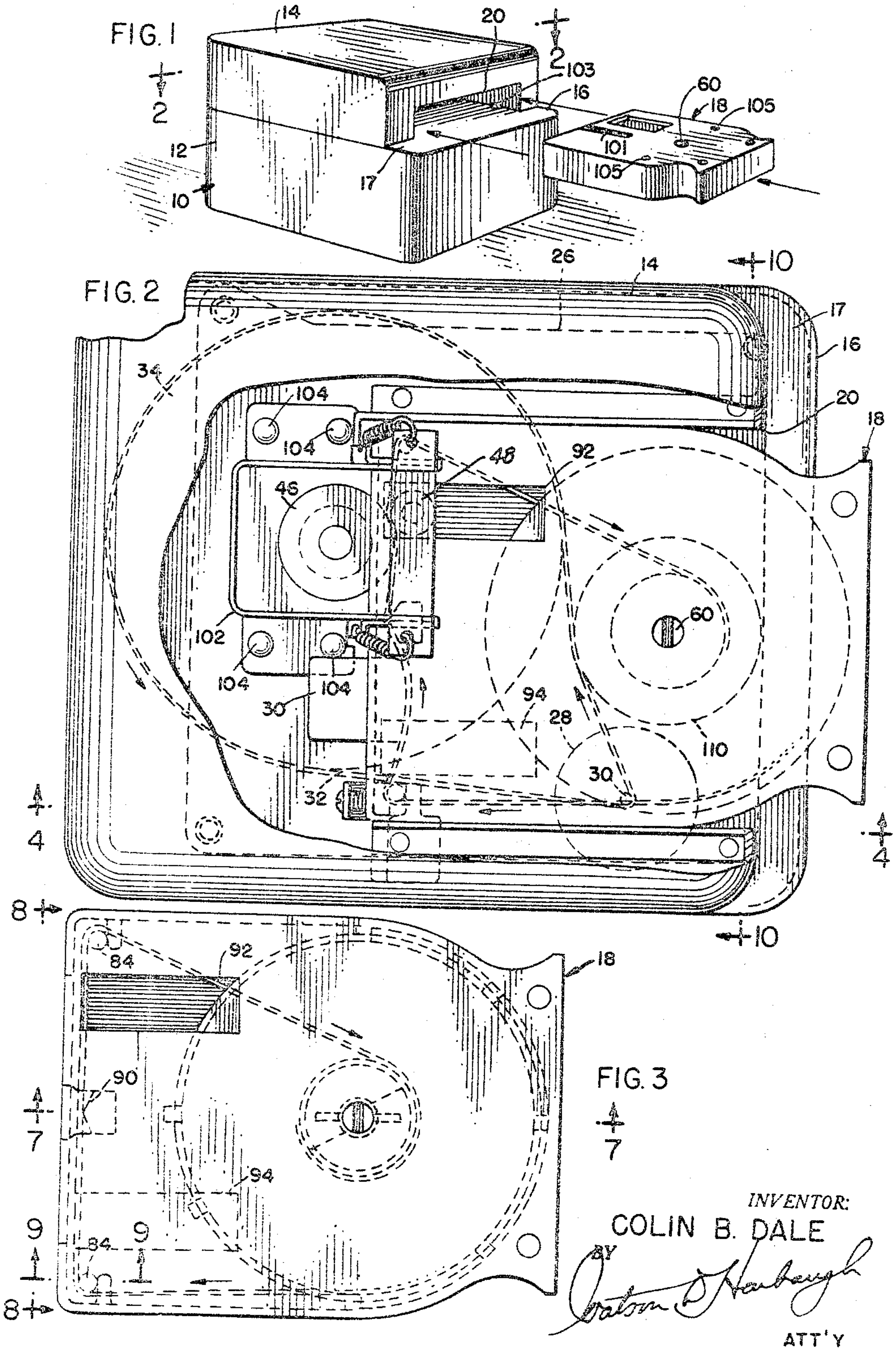
Fig. 1 is a view in perspective of a combined sound recording and reproducing apparatus made in accordance with the present invention, and showing the cartridge in the position it assumes while being inserted.
Fig. 2 is a greatly enlarged plan view, partly broken away, of the device of Fig. 1 illustrating the cartridge in operative position.
Fig. 3 is a plan view of the cartridge of Figs. 1 and 2.

Referring now to the drawings and more particularly to Figs. 1, 2 and 3, the present invention contemplates a portable removable cartridge and a combined recording and reproducing apparatus for receiving it. The sound recording and reproducing apparatus of the present invention includes a housing 10 having a lower section 12 and an upper section 14 superimposed thereon that is offset at the front as at 16 to form a shoulder 17 for guidance of an invertible or "flip-over" tape handling assembly, referred to herein as a cartridge 18. The upper section has an opening 20 in its front wall above the shoulder 17 to receive the cartridge in its guided relationship.

Figure 4:
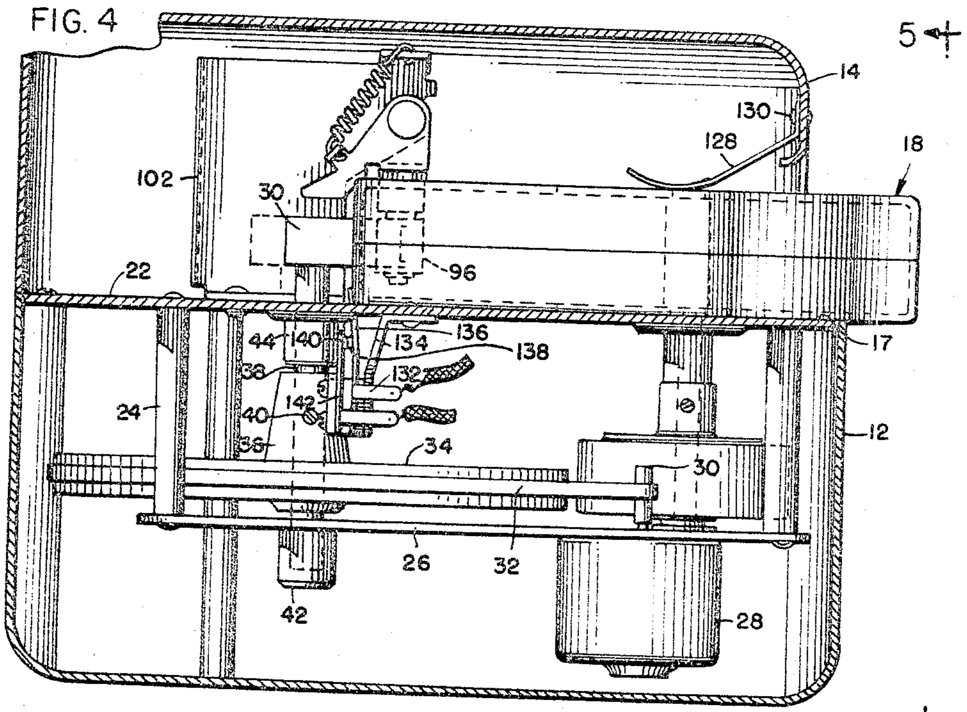
Fig. 4 is an elevational sectional view taken substantially on line 4—4 of Fig. 2, and showing in dotted lines a pivotally mounted idler roller in cooperative relation to a driving roller.

Separating the lower section 12 and the upper section 14 is a partition 22 (see Figs. 4 and 5) from which is supported by means of sleeve spacers 24 a shelf 26. Suspended from the shelf 26 is a constant speed motor 28 which with an associated mechanism advances the recording tape within the removable cartridge 18 over a combined erase-recording and reproducing head 30 carried by the lower section 12 without the need for bringing the tape outside of the cartridge 18. "Head" 30 as used herein and in the claims refers to a paramagnetic transducing head conventionally used in tape recording as illustrated in the Colin B. Dale et al. application for Magnetic Tape Recorder, Serial No. 253,678, filed October 29, 1951.

More particularly, with regard to details of construction and the cooperation of the associated mechanism a friction pulley 31 (Figs. 4 and 5) is mounted on the free end of the shaft of the motor 28 and is connected by means of an elastomerized belt 32 in driving relationship to a wheel 34 whose hub 36 is affixed to a capstan shaft 38 by means of a set screw 40. The lower end of the shaft 38 is journalled and supported against end thrust in a bearing 42 depending from the shelf 26, and the upper end of the shaft 38 extends beyond a bearing 44, secured to the underface of the partition 22, to receive a capstan roller 46 (Fig. 5) against which a roller 48 is brought into engagement at will to drive the tape through the cartridge 18, as will be hereafter described in detail. The belt 32 also drives, in a clockwise direction as viewed from the top in Figs. 4 and 5, a shaft 49 which is journalled at its lower end in a bearing 50 mounted on the shelf 26 and at the other end in a bearing 52 mounted on the bottom wall of a depression 54 formed in the partition 22. The purpose and operation of the shaft 49 will be described more fully hereafter.

In Figs. 3, 7, 8 and 9 are shown details of the cartridge 18 of the present invention. Referring now more particularly to Fig. 7, the cartridge 18 comprises two similar shells 56 and 58 joined marginally facing each other to provide a housing 19. Journalled within the housing is a stub shaft 60 of slightly greater diameter than the shaft 49. At its ends the shaft 60 is turned down to provide reduced journal ends 61 and shoulders 51 that hold the shaft in place. The ends of the shaft 60 are also cross-kerfed to provide slots 62 which receive a correspondingly formed tang 64 on the free end of the shaft 49.

According to the present invention, a pair of spools 66 and 68 having hubs 70 and 72, respectively, of a composite length less than that of the stub shaft are journalled on the stub shaft 60 in a manner that only one spool at a time may be driven by the drive shaft 48 through the medium of the stub shaft 60. To this end, a gravity clutch is provided in which a pin 74 extends through the stub shaft 60, and the hubs 70 and 72 are provided at their inner faces with slots 76 and 78. Thus whichever spool is uppermost its weight will cause it to drop into clutched relationship with the pin 74, due to the force of gravity. The lowermost spool drops down to permit the drive engagement of the upper spool and when it does it is in a position to drag against the casing as the tape is payed out. To provide evenness of drag upon the unwinding spool, a friction pad 80, of cork, felt or the like is cemented to the outer face of the hub 70, and, of course, for similar operation while the cartridge 18 is in an inverted position, a friction pad 82 is cemented to the outer face of the hub 72 of the other spool for use when it is the lowermost spool. By this arrangement, provision is made for the necessary difference in spool speeds because of the difference in the relative diameters of the tape on the spools at a particular time.

In any selective position of the cartridge, such as that shown in Fig. 7, the tape is unwound from the lowermost spool and is fed over one of two rounded edges 84 located at the inner corners of the cartridge housing. For instance, referring now to Fig. 3, the tape is initially fed over the lower edge 84, then over the upper edge 84, and then is wound upon the upper spool 68.

The inner or working end of the cartridge housing is provided with a pair of rectangular openings 86 and 88. The tape is guided by means of a slot 90 formed in the housing, successively past the openings during its course of travel through the cartridge. When the cartridge 18 is brought into one of its alternative operative positions within the casing 10, the combined sound recording and reproducing head 30 projects into the opening 86 to engage the tape. The driven roller 46 projects into the opening 88 where it rotates in a counterclockwise direction, as viewed in Fig. 2, to feed, in cooperation with the roller 48, the tape onto the spool 68.

In order to bring the roller 48 into cooperative tape-driving position, an opening 92 is formed in the top surface of the cartridge 18. And likewise, for inverted operation, a similar opening 94 is formed in the opposite side of the cartridge casing 18. As shown best in Figs. 2 and 6, the roller 48 is journalled on a shaft 96 which is mounted on a U-shaped bracket 98 pivoted at 100 to a U-shaped frame 102 which is secured to the partition 22 by means of rivets 104. The roller 48 is normally maintained in the position shown in Fig. 6 by means of springs 106 which are secured at one end to a latch 108 forming a part of the bracket 98, and at the other end to one of two ears 110 extending outwardly from the arms of the frame 102.

As the cartridge 18 is inserted in the opening 20, it engages a pair of spaced parallel rails 112 which are secured to the partition 22 for guidance of the cartridge 18. As the cartridge 18 is brought into the position shown in Fig. 6, its forward edge engages the latches 108. When the cartridge is moved further inwardly to its stop position, the bracket 98 is pivoted about its axis 100 in a clockwise direction so that the roller 48 is inserted through the opening 92 so that it assumes the position shown in dot-and-dash lines in Fig. 6. In this position, the roller 48, in cooperation with the driven roller 46, forms a bight for positively engaging the tape and winding it on the spool 68 under the influence of the springs 106.

When one-half of the tape has been recorded throughout the length of a particular tape, the cartridge is withdrawn by the operator, inverted and then reinserted in the opening 20 so that the spool 68 on which the tape has just been wound is lowermost, and the spool 66 which is empty is uppermost. In this inverted position, of course, the openings 86 and 88 are transposed so that the recording head 30 is received in the opening 88 while the driving roller 46 is received in the opening 86. In this inverted position, the spool 66 slides down the shaft 60 to a position in which the pin 74 is received in the slot 76 and, consequently, the spool 66 is rotated while the spool 68 is permitted to drag. In addition, the roller 48 is received within the opening 94 and carried to its cooperative working position.

Figure 5:
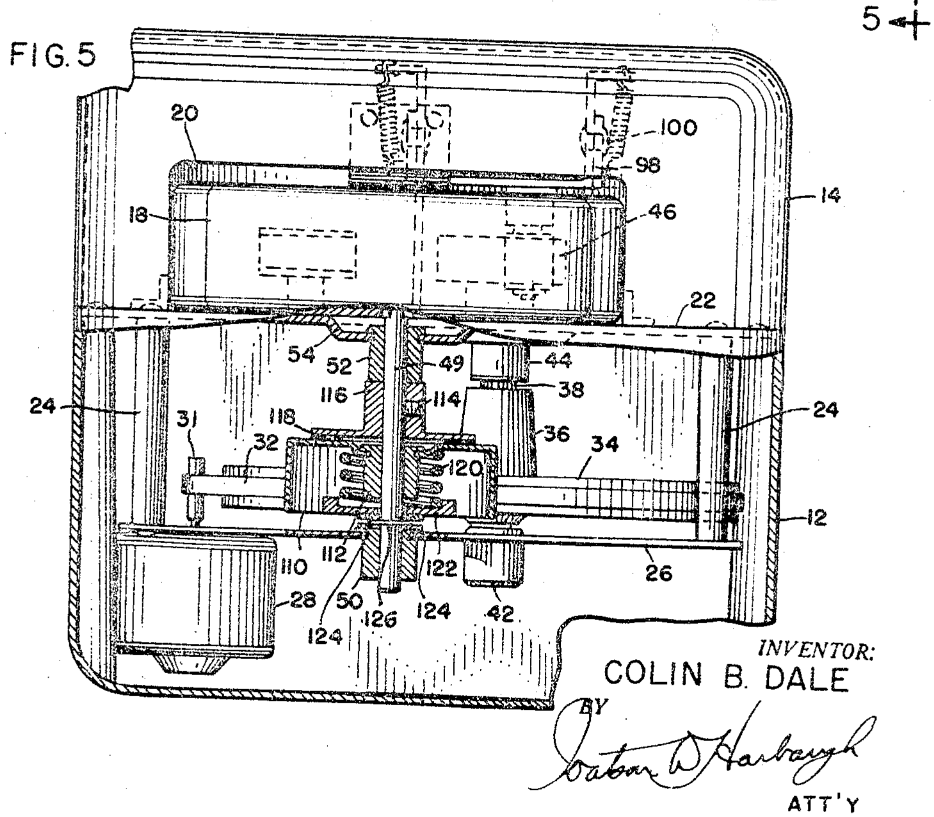
Fig. 5 is a vertical sectional view taken substantially on line 5—5 of Fig. 4.

Referring now more particularly to Figs. 2 and 5, rotation of the shaft 49 in a clockwise direction, as viewed in Fig. 2, is afforded by the engagement of the belt 32 against the periphery of a bell 110 rotatably mounted on the shaft 48 by means of a collar 112. Disposed between the bell 110 and the bearing 52, and affixed to the shaft 49 by means of a set screw 114 is a clutch member 116 which is frictionally engaged by the bell 110 through a friction pad 118, which may be of felt, cork or the like, that is secured either to the flange of the member 116 or to the top surface of the bell 110. The bell 110 is normally retained in the position shown by means of a compression spring 120, the bottom convolution of which rests on a retainer plate 122, which in turn is supported by thrust washers 124 held in position by a split spring 126 lodged in a peripheral groove (not shown) cut in the shaft 49.

With this arrangement the end of the shaft 49 extends above the surface of the shelf 17 and to clear it while the cartridge is being slipped into place, the cartridge is grooved with a groove 101 (Fig. 1) tapering from its working end which clears the front edge, and the shelf 17 is provided with pegs 103 which carry the rear of the cartridge over the shaft 49 until they engage in recesses 105 on the cartridge and drop into place when the shafts 49 and 60 align.

Thus the cartridge can be brought quickly and easily into place and is urged into contact with the upper surface of the partition 22 by a flat spring 128 secured at 130 to the inner surface of the upper section 14 of the housing 10 to establish and maintain the drive shaft engagement described.

According to the present invention also, means are provided for energizing the present recording apparatus when the cartridge 18 is brought into its terminal position. To this end, a switch 132 is mounted below the partition 22 on a bracket 134. This switch includes a movable arm 136 having a contact 138 for engaging a contact 140 mounted on a fixed arm 142. The arm 136 extends upwardly through an opening in the partition 22 and into the path of travel of the cartridge 18. As the cartridge 18 is inserted into the recorder, its leading edge engages the arm 136 and thus completes the control circuit. When the cartridge 18 is removed, the arm 136 moves to the right, as viewed in Fig. 4, and the circuit is deenergized.

It will be apparent that this invention may be embodied in devices which differ in many respects and details from the particular embodiment disclosed. All modifications which do not go beyond the scope of the invention will readily suggest themselves to those skilled in the art. It is, therefore, not intended that the invention be limited to the exact construction shown and described, but only to the inventive concept as defined in the appended claims.

I claim:

1. Apparatus for recording sound on tape and reproducing same comprising a reproducing head, a unitary tape handling assembly including a cartridge having a shaft journalled therein and a pair of spools separately journalled on a shaft for relative movement thereon in an axial direction, means on said shaft for selectively coupling one of said spools to said shaft in driven relationship while permitting the other spool to rotate, drive means for propelling said tape into contact with said head, said drive means including a roller element adapted to be received into said cartridge for engaging said tape, and a drive shaft adapted to rotate said first-named shaft for unwinding the tape from one spool and winding it onto the other spool.

2. Apparatus for recording sound on tape and reproducing same comprising a combined recording and reproducing head, a unitary tape handling assembly including a shaft, a cartridge having a pair of spools coaxially journalled on the shaft for relative movement in an axial direction thereon, gravity clutch means interconnecting said shaft and the spool disposed in uppermost position, said cartridge having a first opening for reception of said head, means for unwinding the tape from spool and winding it on the other spool, means for guiding said tape into contact with said head, said first-named means including a driving roller receivable in a second opening in said cartridge for engaging said tape, and a drive shaft adapted to rotate said first-named shaft.

3. A self-contained cartridge for recording tape comprising a casing, a shaft journalled in said casing, a pair of spools journalled on said shaft in said housing in superimposed relation with substantial clearance in said housing to permit the spools to slide in a direction axially of the shaft, clutch means on said shaft and on one end of each spool for selectively driving one of the spools depending upon which one is lowermost, said casing being formed at one end with a pair of spaced openings, means for guiding said tape past said openings, said openings comprising a first opening adapted when said casing is in one position to receive a recording head for impressing sounds on one half of said tape and a second opening adapted when said casing is in said one position to receive a driving roller for propelling said tape from one spool onto said other spool.

4. Apparatus for recording sound on tape and reproducing same comprising a housing, a reproducing head mounted within said housing, a unitary tape handling assembly receivable in said housing in a manner that the head is engaged by said tape, said assembly including a self-contained cartridge having a casing, a pair of spools journalled in said casing, selective means for rotating one of said spools including a rotatably driven shaft, means for braking rotation of the other of said spools including an element carried by said casing, said casing being formed at one end with a pair of spaced openings, means for guiding said tape past said openings including a guide member between said openings, said openings comprising a first opening adapted when said casing is in one position to receive said recording head for impressing sounds on one half of said tape and a second opening adapted when said casing is in said one position to receive a roller within the contour of said casing to engage the inside face of the tape for propelling said tape from one spool onto said other spool.

5. A self-contained magnetic tape cartridge comprising a flat invertible housing having two corners and a plurality of openings therebetween, guide elements at said corners and between said openings defining a path for the movement of tape between the corner guides, said openings comprising one proximate to one corner accessible from one side of the housing and another one proximate the other corner accessible from the other side of the housing for receiving bodily within said contour of the housing, an element operative to engage the tape on the inside surface thereof and traverse the tape along said path, a further opening spaced from each of said one openings for receiving a reproducing head edgewise therethrough into operative engagement with said tape, means for winding and storing tape in said housing comprising a plurality of reeling hubs journalled in said housing and each having from accessible one end a releasable clutch element engageable in an axial direction and at the other end releasably engaged frictional elements including an element carried by the housing for braking the hubs against rotation, the frictional elements at one end of one hub being releasable when the clutch element of the other hub is in a position to be engaged.

6. The cartridge defined in claim 5 in which the housing is made of two substantially identical halves both having an opening for axial access to said releasable clutch element on each hub.

7. For use in combination with a sound reproducing apparatus having a station for receiving a self-contained cartridge in supported relationship, a reproducing head facing the station, and tape advancing means including a capstan member and an idler member movable towards each other at one side of the head to grip and traverse the tape; said cartridge comprising a flat housing having two corners with an edge of the housing extending therebetween, said housing having a plurality of spaced openings along said edge, guide means including elements at said corners and between said openings for guiding said tape along said edge past said openings along a predetermined path, said openings comprising an opening adjacent one corner adapted to receive one of said members bodily within said casing on the inner side of the tape and the other member externally of the housing on the other side of the tape, another one of said openings adjacent to said one opening being adapted to receive the head edgewise to the housing against said other side of the tape in operative relationship therewith, means for rotating said members to draw the tape across the head and advance it towards the guide element at said one corner, means for storing said tape beyond said guide element at said one corner including a tape reeling hub device journalled in said housing to wind up and store said tape, a disconnectable drive for the hub device including axially aligned elements and a drive spindle journalled in said apparatus.

8. The combination called for in claim 7 including an actuating element carried by said apparatus engaged by said cartridge located in said station for moving said elements into tape gripping cooperation.

9. Apparatus for recording sound on tape and reproducing same comprising a housing having a combined recording and reproducing head, a unitary tape handling assembly adapted to be inserted into said housing so that the tape is brought into operative relation to said head, said assembly including a cartridge having a pair of spools mounted on a common shaft, clutch means for selectively coupling said spools to said shaft, said cartridge having a first opening to afford contact between said head and said tape and guide means for feeding the tape into contact with said head, and drive means for unwinding the tape from one spool and winding it onto the other spool, said drive means including a driving roller receivable in a second opening in said cartridge and engageable with said tape and a drive shaft for rotating said first-named shaft.

10. Apparatus for recording sound on tape and reproducing same comprising a housing having a combined recording and reproducing head, a unitary tape handling assembly adapted to be inserted into said housing so that the tape is brought into operative relation to said head, said assembly including a cartridge having a pair of spools mounted on a common shaft, clutch means for selectively coupling said spools to said shaft, said cartridge having a first opening to afford contact between said head and said tape and guide means for feeding the tape into contact with said head, and drive means for unwinding the tape from one spool and winding it onto the other spool, said drive means including a driving roller receivable in a second opening in said cartridge and engageable with said tape and a drive shaft for rotating said first-named shaft, said cartridge being invertible so that the path of travel of said tape may be reversed.

11. Apparatus for recording sound on tape and reproducing same comprising a housing having a combined recording and reproducing head, a unitary tape handling assembly adapted to be inserted into said housing so that the tape is brought into operative relation to said head, said assembly including a cartridge having a pair of spools mounted on a common shaft, clutch means for selectively coupling said spools to said shaft, said cartridge having a first opening to afford contact between said head and said tape and guide means for feeding the tape into contact with said head, and drive means for unwinding the tape from one spool and winding it onto the other spool, said drive means including a driving roller receivable in a second opening in said cartridge, an idler roller pivotally mounted in said housing and adapted to urge the tape into engagement with said driving roller, and a drive shaft for rotating said first-named shaft, said cartridge being invertible so that the path of travel of said tape may be reversed.

12. Apparatus for recording sound on tape and reproducing same comprising a housing having a combined recording and reproducing head, a unitary tape handling assembly adapted to be inserted into said housing so that the tape is brought into operative relation to said head, said assembly including a cartridge having a pair of spools mounted on a common shaft, clutch means for selectively coupling said spools to said shaft, said cartridge having a first opening to afford contact between said head and said tape and guide means for feeding the tape into contact with said head, and drive means for unwinding the tape from one spool and winding it onto the other spool, said drive means including a driving roller receivable in a second opening in said cartridge, an idler roller normally resiliently urged into an inoperative position within said casing and operative upon actuation by said cartridge to be received in an opening in the top wall of said cartridge and adapted to urge said tape into engagement with said driving roller, and a drive shaft for rotating said first-named shaft, said cartridge being invertible so that the path of travel of said tape may be reversed.

13. In combination with sound recording apparatus including a recording head and a driving roller, a self-contained cartridge for recording tape comprising an invertible casing, a pair of spools mounted in said housing in superimposed relation, said spools being mounted on a shaft adapted to be rotated, means for selectively engaging said spools being mounted on a shaft adapted to be rotated, means for selectively engaging said spools with said shaft, said casing being formed at one end with a pair of spaced openings, and means for guiding said tape past said openings, said openings comprising a first opening adapted to receive the recording head for impressing sounds on one-half of said tape and a second opening adapted to receive the driving roller when said casing is in one position, said first opening being adapted to receive the driving roller and said second opening being adapted to receive the recording head when the casing is reversed whereby to impress sounds on the second half of the tape.

14. Apparatus for recording sound on tape and reproducing same comprising a housing, a combined recording and reproducing head mounted within said housing, a unitary tape handling assembly receivable in said housing in a manner that the head is engaged by said tape, said assembly including a self-contained cartridge having an invertible casing, a pair of spools mounted in said casing in superimposed relation, said spools being mounted on a shaft adapted to be rotated, means for selectively engaging said spools with said shaft, said casing being formed at one end with a pair of spaced openings, means for guiding said tape past said openings, said openings comprising a first opening adapted when said casing is in one position to receive said recording head for impressing sounds on one half of said tape and a second opening adapted when said casing is in said one position to receive a driving roller for propelling said tape from one spool onto said other spool, said first opening being adapted when said cartridge is in inverted position to receive the driving roller while said second opening is adapted to receive said recording head, whereby the path of travel of said tape is reversed.

15. Apparatus for recording sound on tape and reproducing same comprising a housing having a combined recording and reproducing head, a unitary tape handling assembly adapted to be inserted into said housing so that the tape is brought into operative relation to said head, said assembly including a cartridge having a pair of spools mounted on a common shaft, clutch means for selectively coupling said spools to said shaft, said cartridge having a first opening to afford contact between said head and said tape and guide means for feeding the tape into contact with said head, and drive means for winding the tape from one spool and unwinding it onto the other spool, said drive means including a driving roller receivable in a second opening in said cartridge, an idler roller normally resiliently urged into an inoperative position within said casing and operative upon actuation by said cartridge to be received in an opening in the top wall of said cartridge and adapted to urge said tape into engagement with said driving roller, a drive shaft for rotating said first-named shaft, said cartridge being invertible so that the path of travel of said tape may be reversed, and switch means operable upon actuation by said cartridge to energize said drive means and said recording head.

16. Apparatus for recording sound on tape and reproducing same comprising a housing having a combined recording and reproducing head, a unitary tape handling assembly adapted to be inserted into said housing so that the tape is brought into operative relation to said head, said assembly including a cartridge having a pair of spools mounted on a common shaft, clutch means for selectively coupling said spools to said shaft, said cartridge having a first opening to afford contact between said head and said tape and guide means for feeding the tape into contact with said head, and drive means for unwinding the tape from one spool and winding it onto the other spool, said drive means including a driving roller receivable in a second opening in said cartridge, an idler roller normally resiliently urged into an inoperative position within said casing and operative upon actuation by said cartridge to be received in an opening in the top wall of said cartridge and adapted to urge said tape into engagement with said driving roller, and a drive shaft for rotating said first-named shaft, said cartridge being invertible so that the path of travel of said tape may be reversed, said drive shaft being resiliently depressible to afford insertion of said cartridge and being adapted to project into said cartridge for engaging said first-named shaft.

References Cited in the file of this patent

UNITED STATES PATENTS

| | | |
|---|---|---|
| 2,364,556 | Somers | Dec. 5, 1944 |
| 2,609,457 | Thurm | Sept. 2, 1952 |
| 2,632,059 | Camras | Mar. 17, 1953 |
| 2,668,021 | Gleason | Feb. 2, 1954 |
| 2,681,950 | Owens | June 22, 1954 |
| 2,706,638 | Bruderlin et al. | Apr. 19, 1955 |
| 2,713,618 | McNabb | July 19, 1955 |
| 2,732,144 | Jones | Jan. 24, 1956 |